United States Patent [19]

Schnetzer et al.

[11] Patent Number: 4,934,598
[45] Date of Patent: Jun. 19, 1990

[54] SAFETY SHUT-DOWN DEVICE FOR TWO-COMPONENT SPRAYER SYSTEMS

[75] Inventors: Georg Schnetzer, Mäder, Austria; Ferdinand Gübeli, Gams, Switzerland

[73] Assignee: Wagner International AG, Switzerland

[21] Appl. No.: 376,752

[22] Filed: Jul. 7, 1989

[30] Foreign Application Priority Data

Jul. 12, 1988 [DE] Fed. Rep. of Germany ....... 3823606
Jul. 20, 1988 [DE] Fed. Rep. of Germany ....... 3824690

[51] Int. Cl.$^5$ .............................................. B05B 7/12
[52] U.S. Cl. ........................................ 239/67; 417/46
[58] Field of Search ...................... 239/63, 67; 417/46, 417/47

[56] References Cited

U.S. PATENT DOCUMENTS 2,223,913 12/1940 Johnston .
2,765,804 10/1956 Dinkelkamp ...................... 417/46 X
3,816,025 6/1974 O'Neill ............................... 417/46 X

FOREIGN PATENT DOCUMENTS 61922 10/1982 European Pat. Off. .............. 239/63
2421763 11/1975 Fed. Rep. of Germany .

Primary Examiner—Andres Kashnikow
Assistant Examiner—William Grant

[57] ABSTRACT

A component deficiency safety device for two-component sprayer systems comprised of pneumatic and hydraulic/mechanical detection and actuation members. The safety device is adapted for placement in the compressed air line of a spray system, in particular, in the compressed air line that powers the spray component air motors and pumps. A pneumatically controlled main valve cuts-off the compressed air to the air motors upon detection of a deficiency condition. The main valve is controlled through a pneumatic control input which is fed from the output of an OR valve having a start-up input and a normal operation/safety shut-down input. Individual pressure transducer/valve assemblies are associated with each component supply line. The outputs from these assemblies form separate inputs to an AND valve which, in turn, enables the main valve only when both transducer/valve assemblies indicate the presence of proper component supply pressure.

15 Claims, 6 Drawing Sheets

SAFETY SHUT-DOWN DEVICE FOR TWO-COMPONENT SPRAYER SYSTEMS

BACKGROUND OF THE INVENTION

The present invention is directed to a safety device for use in connection with two-component sprayers, for example, for the spray application of paint or lacquer. More particularly, the present safety device automatically and, importantly, without danger of explosion, terminates sprayer operation in the event of a deficiency or interruption in the supply of either of the two components required for proper sprayer operation.

Sprayer safety devices are known to the art. However, such known devices employ electrical pressure sensors that are inserted into the component material supply lines between the pumps and the sprayer mechanism. When a pressure drop is detected in one of the component supply lines during operation of the two-component sprayer, the respective pressure sensor outputs an electrical signal that shuts the entire sprayer off, for example, by closing solenoid valves in the component supply lines.

A significant disadvantage of such prior art safety devices, however, is their known unsuitability for use in potentially explosive environments, for example, the spraying of low ignition temperature materials. Many paints and lacquers fall into this latter category. This unsuitability is based on the ever-present danger of a spark-induced explosion inherent in any electrically excited transducer or actuated system.

SUMMARY OF THE INVENTION

It is therefore an object of the present invention to provide an improved deficiency safety device for two-component sprayer systems, in particular, a safety device that is both uncomplicated and faultless in operation and, importantly, one that guarantees absolute protection against explosion.

The deficiency safety device of the present invention employs no electrical circuitry, either in the detection of a deficiency condition or in the corresponding actuation of the responsive shut-down mechanism. Rather, pneumatic and hydraulic/mechanical elements are utilized exclusively thereby suppressing any and all risk of explosion. And further, the present apparatus permits use of commercially available valves for the pneumatic elements thereby maintaining comparatively low production costs.

Additional features and advantages of the present invention will be apparent from the figures and specification, below.

DESCRIPTION OF THE PREFERRED EMBODIMENT

FIGS. 1-4 illustrate a preferred arrangement of the sprayer component deficiency safety device 10 of the present invention.

Safety device 10 is especially intended for placement in the pneumatic compressed air line of a two-component sprayer system and, more particularly, for insertion between a source of compressed air (not shown) and a pump arrangement (not shown), the latter preferably comprising a pair of air motors driving respective first and second spray material component pumps. With specific reference to FIG. 1, inlet 12 is connected to the compressed air source while outlet 14 ultimately delivers the compressed air to the air motors but, as more specifically set forth herein, only under normal operational conditions (FIG. 3).

Figure 1:
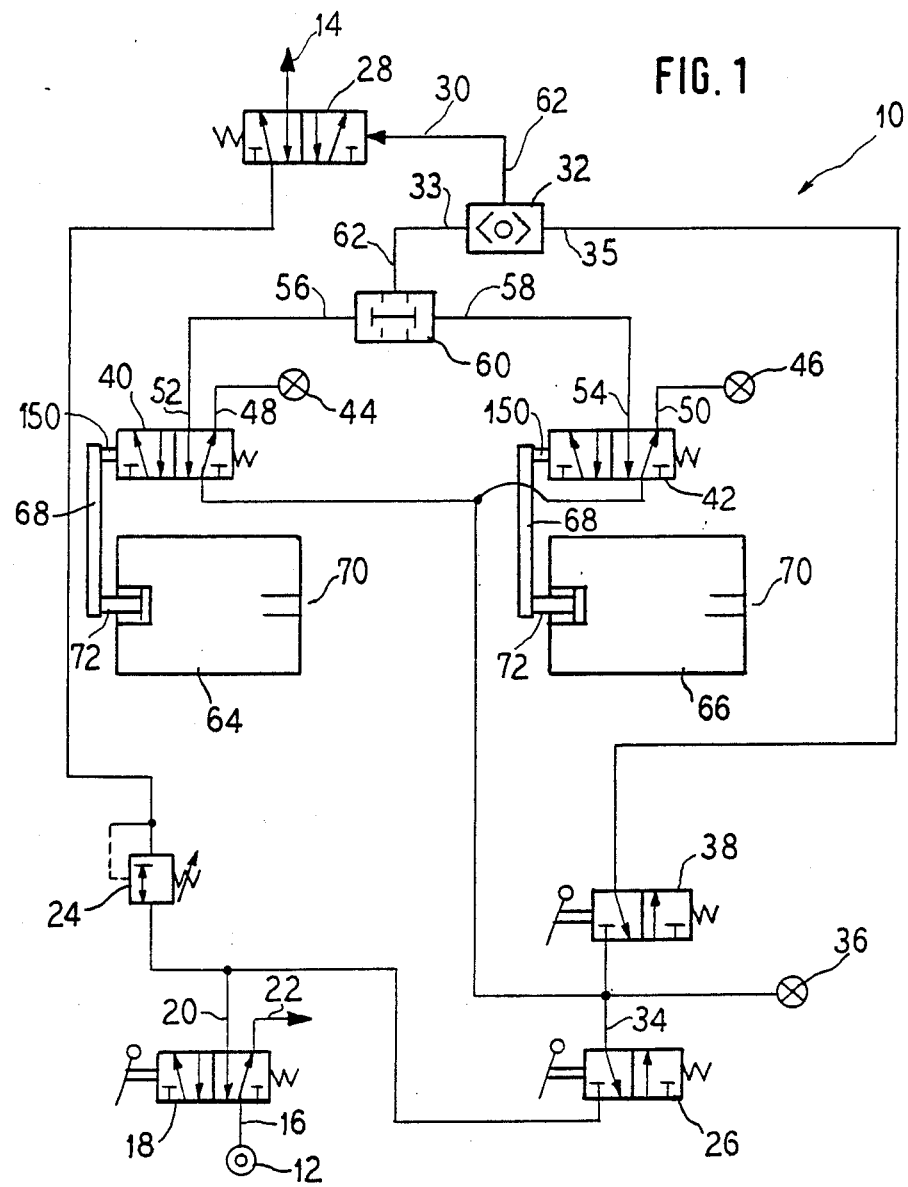
FIG. 1 is a schematic representation of the safety device of the present invention illustrated in the rinse mode.

The compressed air source (at 12) is first routed to the inlet 16 of a two-position operating mode valve 18 having manually selectable outlets 20 and 22. This valve functions to permit user selection of either a normal spraying mode (inlet 16 switched to valve outlet 20) or a rinsing mode (inlet 16 switched to valve outlet 22). As the safety shut-down features of the present invention are not required during rinse operations, safety device 10 is bypassed, as shown in FIG. 1, in the rinse mode.

Figure 2:
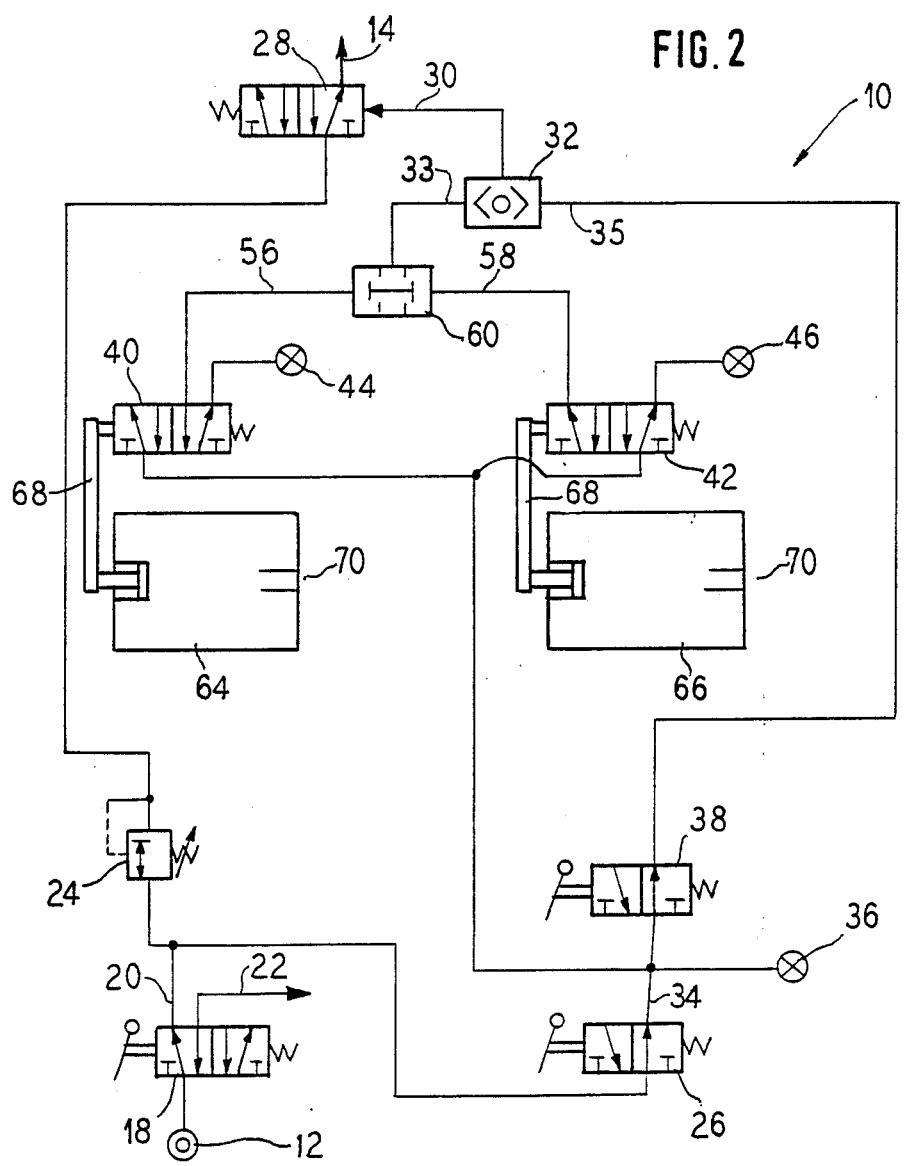
FIG. 2 is a schematic representation of the safety device of FIG. 1 shown in the spraying mode during the sprayer start-up sequence.
Figure 3:
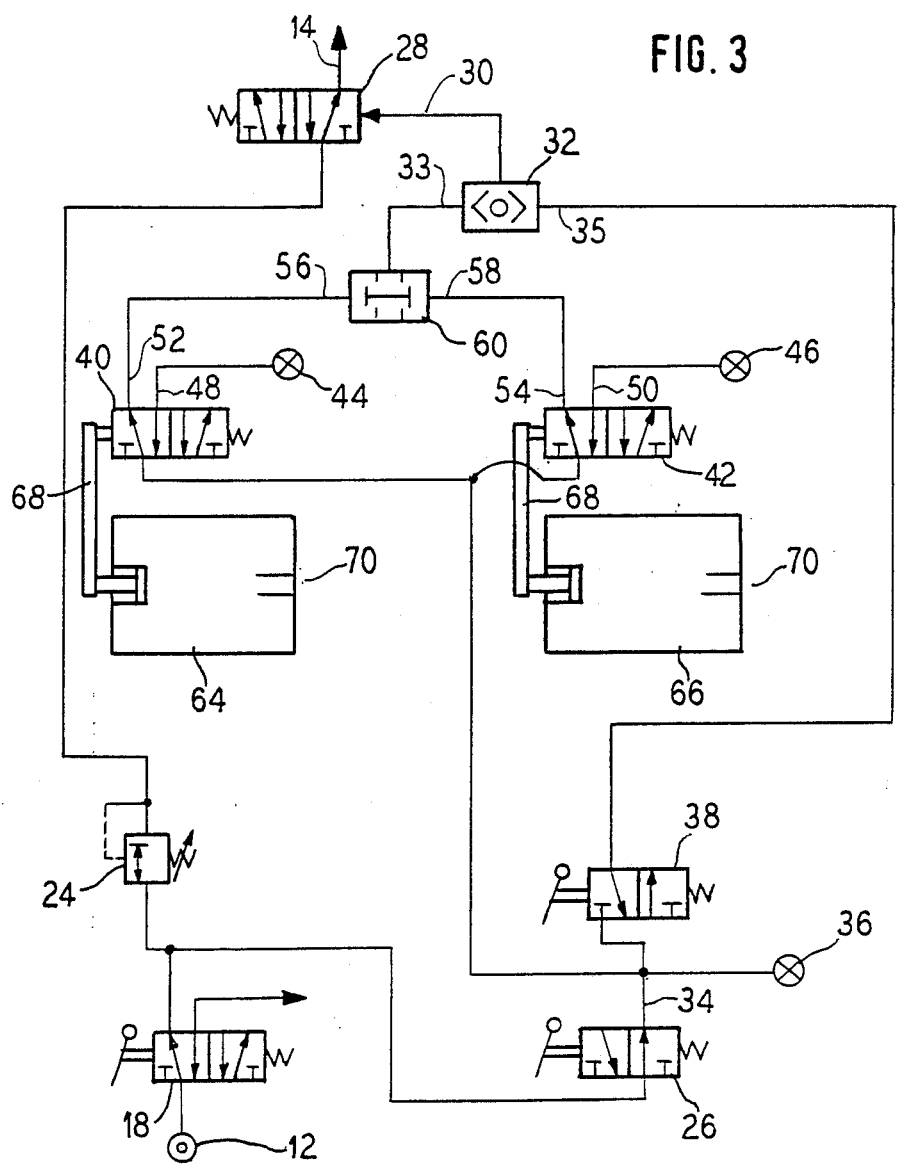
FIG. 3 is a schematic representation of the safety device of FIG. 1 shown in normal spraying mode operation.
Figure 4:
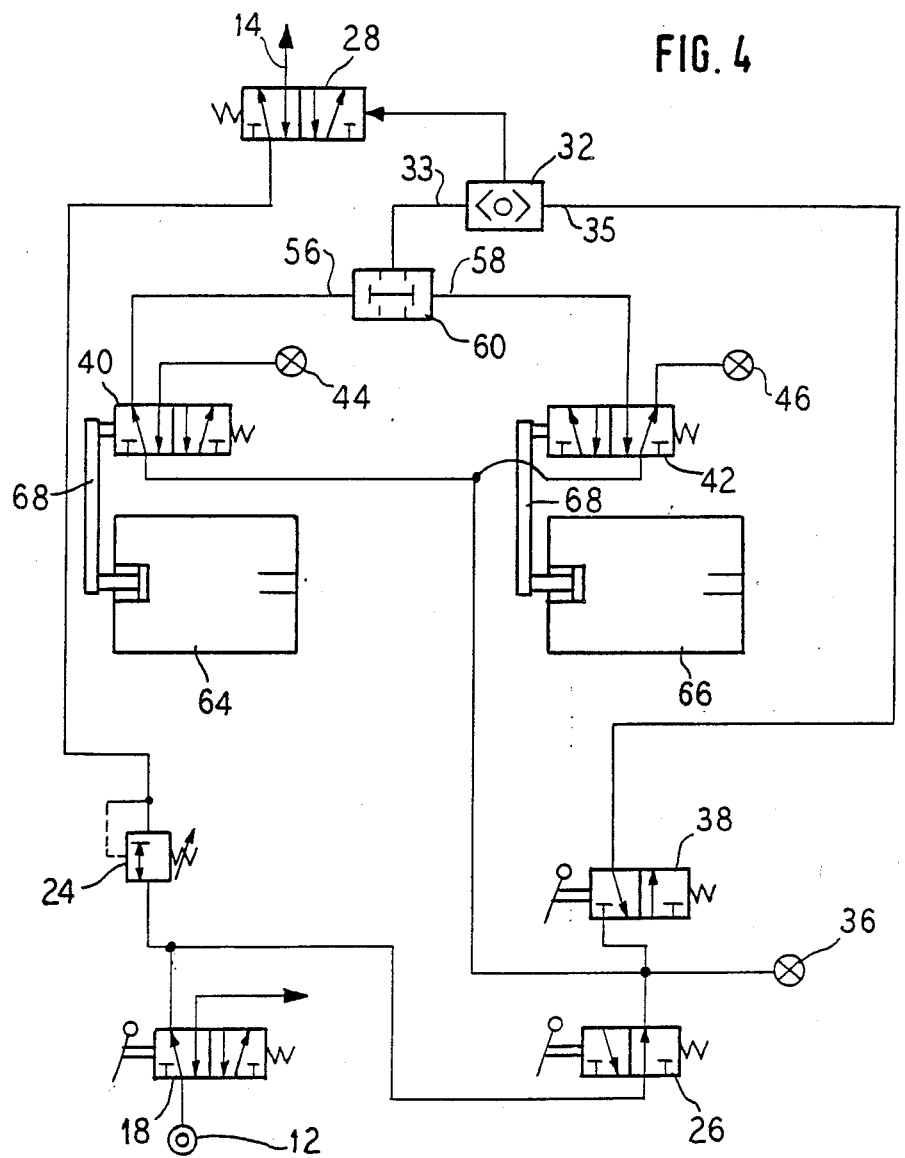
FIG. 4 is a schematic representation of the safety device of FIG. 1 shown in the spraying mode following safety shut-down in response to the detection of a component deficiency condition.

FIGS. 2-4 illustrate operation of safety device 10 with mode selector valve 18 positioned for normal sprayer operation. In this mode, compressed air from valve outlet 20 is routed to a pressure regulator 24 of conventional design and to a second manually actuable on/off starting valve 26. As described in more detail below, closing the on/off valve 24 (FIG. 1) terminates or precludes sprayer operation while opening this valve (FIGS. 2-4) permits the continuance or start-up of normal sprayer operation. Pressure regulator 24 sets the spraying pressure and may be combined with a pressure limiter for the protection of the air motors.

The regulated compressed air output from regulator 24 is thereafter directed to the safety device outlet 14 through a pneumatically controlled main valve 28. Proper sprayer operation requires that this main valve be "on" (FIGS. 2 and 3) in order that compressed air be available to the air motors. As detailed below, main valve 28 remains "off" in the rinse mode (FIG. 1) and upon the detection of a spray component deficiency condition (FIG. 4). Main valve 28, therefore, serves as the actual relief or "safety valve" to disconnect the compressed air from the air motors upon the occurrence of a deficiency condition associated with either of the two spray components. Additional pressure regulators (not shown) may be placed between safety device output 14 and the pressure motors.

Main valve 28 is spring-biased into a normally-closed or "off" state (FIGS. 1 and 4) thereby terminating, as previously described, normal sprayer operation by blocking the supply of compressed air to the air motors. A pneumatic control input 30 is provided to the main valve which, upon the supply of a sufficient pneumatic pressure thereto, overcomes the internal spring tension thereby switching the valve to its "on" or open condition.

The pneumatic pressure required to activate main valve 28 is derived from a two-input shuttle valve 32. Shuttle valve 32 functions in a logical "OR" sense, that is, it opens to admit passage of compressed air to the main valve if a source of compressed air is available at either of its two inputs, such inputs being designated 33 and 35. Thus, the main valve 28 will be and remain enabled whenever pneumatic pressure is present on either or both of these shuttle valve inputs.

The outlet 34 of the previously described on/off starting valve 26 branches to provide compressed air to three components: a pressure indicator 36; a third manually actuable starting valve 38; and a pair of mechanically actuated component deficiency valves 40 and 42. The pressure indicator 36 provides a visual means for the user to verify the presence of certain preliminary conditions necessary for proper sprayer operation. Specifically, indicator 36 will be activated only when a proper supply of compressed air is available at inlet 12; when mode selector valve 18 is in the non-rinse mode (i.e. normal spraying mode); and when on/off valve 26 is on.

As noted, another branch of compressed air from on/off valve 26 feeds starting valve 38, the output of which defines the input 35 of shuttle valve 32. Start-up of the sprayer is achieved by temporarily opening valve 38 (i.e. placing it in the "on" condition) thereby routing pneumatic pressure to the main valve 28 through shuttle valve 32. This assumes, as previously noted, that mode and on/off valves 18 and 26 are in their respective "spraying mode" and "on" positions. Overall operation of the present safety device, including starting procedures, is considered in more detail below.

The third branch from on/off valve 26 is fed in parallel to the inlets of the two mechanically actuated component deficiency valves 40 and 42. As described in more detail below, each valve 40,42 is associated with one of the sprayer components and is uniquely responsive to the supply status of that component.

A pair of pressure indicators 44,46 are connected to normally-open or "on" outlets 48,50 of deficiency valves 40 and 42, respectively, and function to provide the user with a visual signal of a spray material deficiency condition.

The second, or normally-off, outlets 52,54 of deficiency valves 40,42 are routed to and define respective inputs 56 and 5 of a pneumatically operated "AND" valve 60. Valve 60 functions to supply pneumatic pressure at its output 62, but only when pneumatic pressure is simultaneously available at both of its inputs 56,58.

Component deficiency valves 40,42 are spring-biased to the position shown in FIG. 1. In this position the pressure inputs are interconnected to respective pressure indicators 44,46. No connection is made to outputs 52,54 nor to AND valve 60.

Deficiency valves 40,42 are mechanically actuated by respective pressure transducers 64,66 which, as detailed below, engage corresponding valves 40,44 through a pivotal balance beam lever arrangement 68.

Construction and operation of pressure transducers 64,66 are considered in more detail below, but for the present discussion it is sufficient to note that each transducer has a pressure inlet 70, operatively interconnected to a pressurized spray component supply, and an output shaft 72 which is driven outwardly from the transducer housing in response to the presence of a predetermined pressure at the pressure inlet and which thereby actuates the respective component deficiency valve 40,42.

More specifically, upon detection of the requisite component pressure by a transducer 64,66 the corresponding valve 40,42 is mechanically actuated which, in turn, switches pneumatic pressure from the pressure indicator 44,46 to the AND valve 60. With both spray components operating at normal pressure, valves 40 and 42 will be actuated with corresponding pressure being communicated to both AND valve inputs 56,58 and, in turn, to the shuttle valve input 33.

The described component deficiency safety device operates as follows. Referring to FIG. 1, the present safety device is shown in the off or idle condition, that is, with on/off valve in the "off" position. In this condition, all pneumatically or mechanically operated valves are in their spring-biased "off" positions, i.e. valves 28, 40, and 44. Starting valve 38 is ordinarily "off" as well, although it will be seen that, as long as on/off valve 26 is "off", turning starting valve 38 "on" has no effect. In addition, mode selector valve 18 is shown in the "rinsing" position although, again, switching the mode selector to the "spraying" mode will not result in commencement of sprayer operation until completion of the normal starting sequence described hereinafter.

For starting, the mode and on/off valves 18 and 26 are manually placed, respectively, in their "spraying" and "on" positions (FIGS. 2–4). This, in turn, results in the delivery of pneumatic pressure to the inlets of main valve 28, component deficiency valves 40,42, and the starting valve 38. Pressure indicator 36 will thereafter signal the presence of the requisite pneumatic pressure for system operation and start-up while component supply indicators 44,46 will continue to signal the absence of proper component supply pressures. With starting valve 38 remaining closed or "off", however, no source of pneumatic pressure will be supplied to either shuttle valve input 33,35 and consequently the main valve 28 remains closed.

Referring to FIG. 2, normal spraying operation is commenced by manually holding the starting valve 38 in the actuated or "on" position shown. Compressed air is thereafter communicated to input 35 of shuttle valve 32 and through this valve to the main valve control input 30. In this manner the main valve 28 is opened thereby supplying compressed air to the air motors through outlet 14.

After a run-up time sufficient to permit the air motors and spray component pumps to achieve normal operating speeds, the component pressures at transducer inlets 70 will rise above the threshold level necessary to cause actuation of the transducers 64,66. This, in turn, results in the enabling of component valves 40,42 and the simultaneous application of pneumatic pressure to both inputs 56 and 58 of AND valve 60. Upon the detection of pneumatic pressure at both inputs, valve 60 switches "on", i.e. to a through-put condition, thereafter supplying a continuing source of pressurized air to the control input 30 of the main valve 28 through input 33 of shuttle valve 32. As pressure is required at only one of the shuttle valve inputs, and as pneumatic pressure is now being supplied through input 33, the starting valve 38 may now be returned to its "off" position. FIG. 3 illustrates the positioning of all valves during normal operation following the above-described start-up sequence.

FIG. 4 illustrates the operation of the present safety system under a fault condition where a loss of component supply pressure is detected on one or both component supply lines. (FIG. 4 specifically depicts the loss of component pressure on the line connected to transducer 66.) When the pressure drops off in one of the two spray component lines between the pumps and the sprayer device, for example due to a blockage of the line for delivering spray material to the pump, then the corresponding transducer 64,66 deactivates, in turn, mechanically switching component valve 40,42 "off". Deactuation of either component valve results in the loss of pneumatic pressure at the corresponding input 56 or 58 of AND valve 60 while, additionally, triggering the appropriate indicator 44,46 thereby signalling the user of the component supply problem.

As noted, the loss of pneumatic pressure at either AND valve 60 input results in valve closure and, in turn, the concomitant loss of pressure at shuttle valve input 33. As the other shuttle valve input 35 is also without pressure, by reason of the closure of valve 38 after system start-up, pneumatic pressure is lost to the control input 30 of the main valve. The system is therefore immediately shut down pending intervention by the user to correct the underlying cause of component pressure failure. Once the problem has been corrected, the previously described start-up procedure may again be undertaken.

Figure 5:
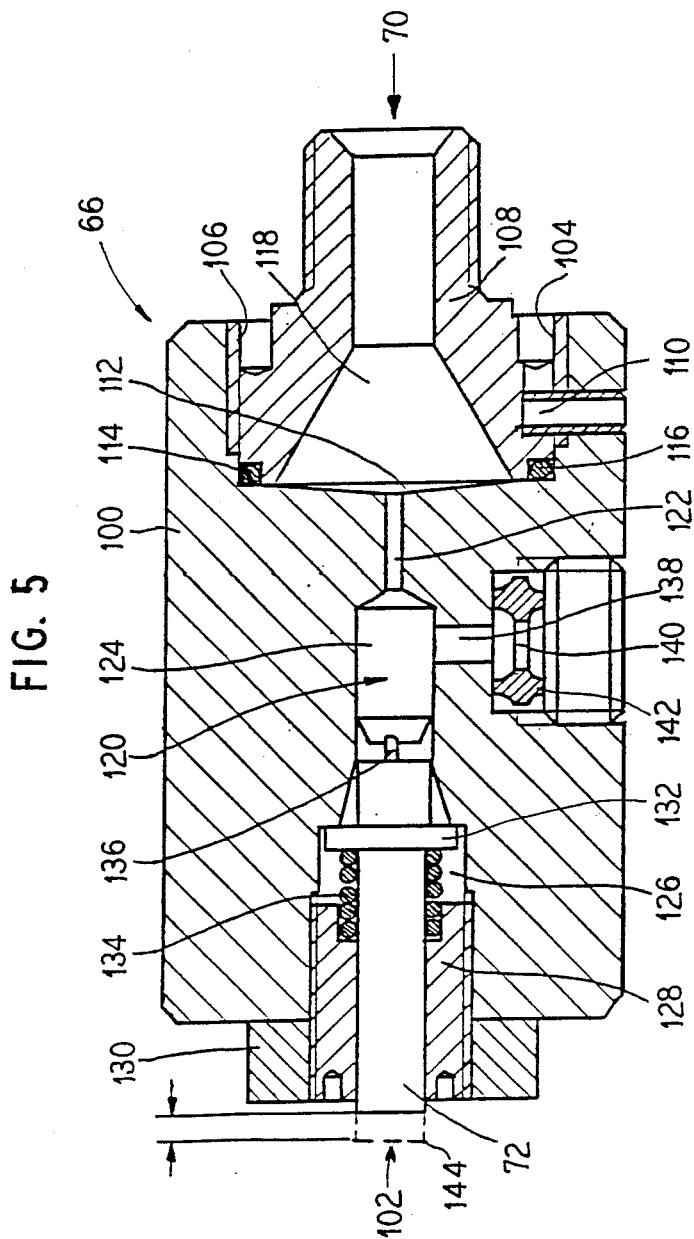
FIG. 5 is a sectional view of a pressure transducer, taken along the longitudinal axis thereof, as shown schematically in FIG. 1.

FIG. 5 depicts a preferred arrangement for the pressure transducers 64,66. Each transducer comprises a cylindrical housing 100 having a longitudinal channel 102 therethrough. Channel 102 is of generally cylindrical cross-section, although the overall channel defines four longitudinal regions, each of differing bore diameter, as more particularly set forth below.

A first bore 104 is formed in one end of the transducer housing and is internally threaded, at 106, to receive and rigidly retain a coupling member 108 therein. Coupling member 108 defines the pressure inlet 70 of the transducer as shown in FIGS. 1–4. Coupling member 108 is secured against inadvertent removal by a threaded pin 110 transversely oriented with respect to the longitudinal axis of the housing and coupling member.

The coupling member 108 additionally functions to secure a membrane 112, which membrane is oriented transversely relative to the longitudinal axis of the housing, in position generally at the innermost end of coupling member bore 104. More specifically, membrane 112 is pressed against an annular surface 114 of housing 100 by coupling member 108. An O-ring 116 seals the circumference of the membrane against the housing thereby dividing channel 102 into two separate chambers 118 and 120. The membrane is preferably composed of stainless steel although any arbitrary, deformable material which is resistant to hydraulic fluid may be employed.

Chamber 118 defines the inlet side of membrane 112 and is in fluid communication with one of the pressurized spray component lines. When properly functioning, such spray component is under pressure and, therefore, acts to force or urge the membrane inwardly into the housing (leftwardly as depicted in FIG. 5).

The second chamber 120 is, itself, comprised of three subchambers 122, 124, and 126, each uniquely distinguishable by bore diameter. Subchamber 122, immediately leftward and adjoining membrane 112 (FIG. 5), has the smallest of the three subchamber bore diameters. Next, and in direct fluid communication therewith, is subchamber 124. Subchamber 124 is characterized by a bore of greater diameter than subchamber 122, but of narrower diameter than that of the third subchamber 126, the latter subchamber extending leftwardly therefrom to the longitudinal end of the housing.

The transducer output shaft 72, the diameter of which is similar to that of the second or middle subchamber 124, is retained by sleeve 128 for reciprocal motion in subchambers 124 and 126. Sleeve 128 is threadably received within the bore of subchamber 126. A locking nut 130 threaded over the sleeve and against the housing secures the sleeve against gradual and unexpected removal.

An annular collar 132 is rigidly affixed along the transducer shaft and serves, first, as an abutment surface against which spring 134 acts and, second, as a limit member restricting the maximum inward (rightward, FIG. 5) travel of the shaft. The above noted spring 134, of the compression type, is concentrically positioned over the shaft and, acting against the sleeve 128 and shaft collar 132, biases the shaft inwardly to its limit position as depicted in FIG. 5.

Rigidly affixed to the inward end of shaft 72 is an annular leathering 136. Leathering 136 is adapted for reciprocal motion within subchamber 124 and, further, acts as a seal against the passage of hydraulic fluid from subchamber 124 leftwardly generally into the subchamber 126 region. In short, the shaft 72 and leathering 136 define a piston reciprocally moveable within the bore of subchamber 124 under the counteracting forces acting thereon. The first of these counteracting forces is the rightwardly acting force generated by the previously discussed spring 134.

The second counteracting force is hydraulically generated, as described hereinafter, by the presence of hydraulic fluid in subchamber 124. This force acts to force shaft 72 outwardly (to the left) which, in turn, causes the actuation of the corresponding component deficiency valve 40,42.

Hydraulic fluid is admitted to subchamber 124 through a transverse passage 138 which runs from the outside of housing 100 to point inside subchamber 124 that is not brushed by the leathering. A screw plug 140 and deformable seal 142 closes passage 138 after filling the subchamber with hydraulic fluid.

The pressure transducer 66,68 operates in the following way. First, plug 140 is removed and transmission or hydraulic fluid is admitted through passage 138 until the appropriate internal chambers are filled. More specifically, these chambers include subchambers 122 and 124 between the leathering 136 on the left and the membrane 112 on the right. Preferably all air should be displaced from the above-described hydraulic subchambers. This may be achieved by overfilling these subchambers and, upon the insertion of plug 140, pre-stressing the membrane 112, that is, causing it to arc outwardly toward inlet 70. Such pre-stressing, however, is not sufficient to cause movement of shaft 72 which remains in its maximum inward position as a consequence of the spring 134. It is also possible to undertake the evacuation of residual air, although not overfilling the subchambers, by displacing the air upon the insertion of plug and the deformation of its seal 142. Coupling 108 is now connected to the fluid line whose pressure is to be monitored, for example, to the fluid line between the high-pressure component pump and the spray gun of a two-component high-pressure sprayer.

Under normal sprayer operations, the hydrostatic pressure associated with each spray component acts on the membrane 112 thereby forcing it leftwardly in the direction of shaft 72. This leftward motion is transmitted, by reason of the hydraulic fluid in subchambers 124 and 126 onto the front face of the shaft 72 leathering 136 which, in turn, urges shaft 72 from its resting position, illustrated in FIG. 5, to the extended position depicted by dotted lines 144, again, of FIG. 5. As detailed below with reference to FIG. 6, the outward extension of transducer shaft 72 is transmitted through the balance beam lever 68 thereby engaging and actuating the corresponding component deficiency valve 40,42. In the event of a loss of component spray pressure, there is a corresponding reduction in the leftward membrane pressure thereby resulting in the return of the shaft to its non-actuated position under the force of spring 134.

Figure 6:
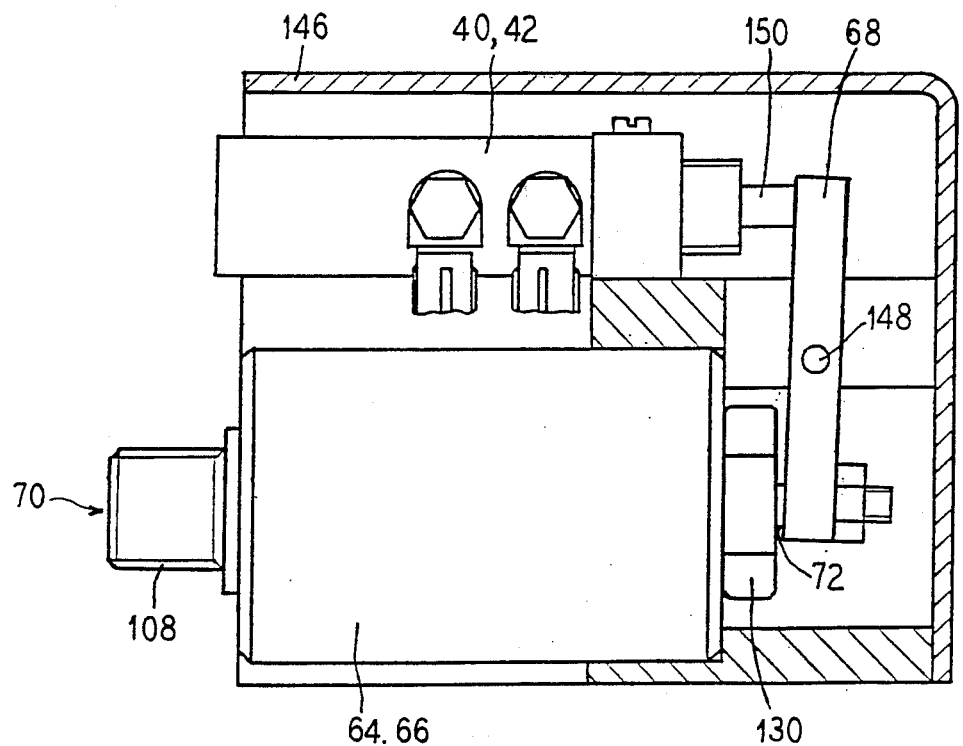
FIG. 6 is a partially broken-away view of the pressure transducer housing illustrating the mechanical relationship between a pressure transducer and a mechanically-operated pneumatic valve.

FIG. 6 illustrates the interconnection of pressure transducers 66,68 and component deficiency valves 40,42 through the pivotal balanced beam lever 68. More specifically, each transducer 66,68 is paired with a corresponding valve 40,42, both being rigidly secured to a protective housing 146. Lever 68 is secured at 148 to the housing for pivotal movement thereon.

The above-described transducer/valve combination is shown (FIG. 6) in its quiescent state, that is, where insufficient component fluid pressure is applied at inlet 70. In this state, the self-biasing spring forces of valve 40,42 and transducer 64,66 close the valve and return the output shaft 72 of the transducer to its fully retracted position.

Upon application of the requisite spray component fluid pressure at inlet 70, the transducer output shaft 72 is forced, as set forth above, outwardly which, in turn, is translated, by reason of the counterclockwise rotation of lever 68, into the inward (leftward) movement of valve actuating member 150. Valve 40,42 thereafter opens and remains open until the sprayer system is shut-down or until a loss of component spray pressure is detected by transducers 64,66.

It will of course be understood that the invention is not limited to the exemplary embodiments that have been shown; rather, numerous modifications thereof are possible without leaving the scope of the invention.

We claim as our invention:

1. Two-component sprayer apparatus comprising at least two component spray pumps for the delivery of pressurized spray material through separate first and second spray material lines, the pumps being driven by at least one air motor, a source of compressed air to power the air motor, a deficiency safety device for interrupting the supply of compressed air to the air motor upon the occurrence of a pressure drop in one of the spray material lines, the deficiency safety device including a main valve having a pneumatic control input, said main valve being operatively positioned between the source of compressed air and the air motor to switch on/off the source of compressed air to the air motor in response to the pneumatic pressure on the control input, a pneumatic AND valve having first and second inputs and an output, the output being operatively connected to the main valve control input thereby to switch the main valve on whenever a predetermined pneumatic pressure is applied to both first and second inputs of the AND valve, first and second means operatively connected, respectively, to first and second material spray lines and valve inputs for providing pneumatic pressure to said inputs whenever a predetermined spray material pressure is present on the spray material lines whereby the loss of spray material pressure in connection with either or both spray material lines results in the switching off of the main valve and corresponding shut-down of the sprayer apparatus.

2. The two-component sprayer apparatus of claim 1 in which the deficiency safety device further includes a starting circuit and a pneumatic OR shuttle valve, the shuttle valve having an output connected to the control input of the main valve and first and second inputs connected, respectively, to the AND valve output and the starting circuit, the starting circuit including a manually actuable starting valve for applying pneumatic pressure to the OR valve whereby the main valve may be switched on by manually actuating the start starting valve and shall remain on after the release thereof if the pressure in both material spray lines has attained said predetermined level.

3. The two-component sprayer apparatus of claim 1 including first and second pressure display means operatively connected to respective first and second AND valve inputs, said display means providing independent visual indications to the system user of a pressure drop associated with each of the spray lines.

4. The two-component sprayer apparatus of claim 1 in which each component deficiency valve means includes a pressure transducer, the transducer including a housing having an open region therein, the open region being divided into two chambers by a membrane, the first chamber being in communication with a pressurized material spray line, the second chamber having a cylindrical channel region therein and opening to the outside of the housing, an actuating piston mounted for reciprocal motion within the channel region between first deactuated and second actuated positions, spring means operatively engaging the housing and the piston for biasing the piston to the first deactuated position, hydraulic fluid within and substantially filling the second chamber generally between the membrane and the piston whereby increasing spray material pressure causes the membrane to move against the second chamber hydraulic fluid, in turn, forcing the piston to its second actuated position.

5. The two-component sprayer apparatus of claim 4 including a bore within the housing, said bore being in fluid communications between the second chamber and the outside of the housing thereby to provide an aperture through which hydraulic fluid may be admitted to the second chamber, an elastic closure plug for placement in the aperture to thereby seal the aperture and second chamber against the loss of hydraulic fluid therefrom.

6. The two-component sprayer apparatus of claim 4 in which the cylindrical channel region comprises three subchamber regions of different diameters, whereby the subchamber region having the smallest diameter joins to the membrane, the piston is slidably retained in the subchamber region having the largest diameter and remote from the membrane and in the intervening subchamber region having the medium diameter.

7. The two-component sprayer apparatus of claim 6 including a screw sleeve in the largest subchamber region serving as a piston guide and an annular collar on the piston, the spring means acts against said piston guide and piston collar.

8. The two-component sprayer apparatus of claim 4 characterized in that the transmission fluid between the membrane and control piston resides under a slight over-pressure that prestresses the membrane.

9. An explosion resistant safety shut-down device for two-component sprayer systems, said systems having fluid pumps connected to first and second pressurized component spray lines and at least one air motor driving the pumps, and a source of compressed air to power the air motor; the safety shut-down device including a pneumatically actuated main valve having a control input and a pair of inlets for connection to the air motor and the compressed air source whereby the source of compressed air to the air motor may be controlled in response to the pneumatic pressure on the main valve control input; means for generating a first pneumatic pressure signal in response to a predetermined minimum pressure on one of the component spray lines; means for generating a second pneumatic pressure signal in response to a predetermined minimum pressure on the other component spray line; means operatively connected to the first and second signal generating means and to the main valve control input for generating a third pneumatic pressure signal on the main valve control input in response to the simultaneous presence of both first and second pneumatic pressure signals whereby the loss of proper component pressure on either of the component spray lines causes the main valve to close thereby shutting down sprayer operation without risk of electrical spark-induced explosion.

10. An explosion resistant safety shut-down device for two-component sprayer systems, said systems having fluid pumps connected to first and second pressurized component spray lines and at least one air motor driving the pumps, and a source of compressed air to power the air motor; the safety shut-down device including a pneumatically actuated main valve having a control input and a pair of inlets for connection to the air motor and the compressed air source whereby the source of compressed air to the air motor may be controlled in response to the pneumatic pressure on the main valve control input; means for generating a first pneumatic pressure signal in response to a predetermined minimum pressure on one of the component spray lines; means for generating a second pneumatic pressure signal in response to a predetermined minimum pressure on the other component spray line; means operatively connected to the first and second signal generating means and to the main valve control input for generating a third pneumatic pressure signal on the main valve control input in response to the simultaneous presence of both first and second pneumatic pressure signals, said means for generating the third pneumatic pressure signal being an AND valve having two inputs respectively connected to the first and second signal generating means whereby the third pneumatic pressure signal is generated in response to pressure signals on both of the AND valve inputs whereby the loss of proper component pressure on either of the component spray lines causes the main valve to close thereby shutting down sprayer operation without risk of electrical spark-induced explosion.

11. The explosion resistant safety shut-down device of claim 9 wherein each of the first and second pressure signal generating means has a pressure detection transducer mechanically interconnected to a pneumatic component deficiency valve, the transducer having an inlet for connection to a component spray line and the component deficiency valve having an inlet for connection to a source of compressed air and an outlet operatively connected to the means for generating the third pneumatic pressure signal whereby the presence of a predetermined minimum pressure at the transducer inlet causes the transducer to open the component deficiency valve thereby generating a respective first or second pneumatic pressure signal.

12. The explosion resistant safety shut-down device of claim 11 in which the mechanical interconnection between each pressure transducer and deficiency valve includes a piston extending from the pressure transducer and wherein each pressure detection transducer includes a housing having first and second fluid tight chambers defined therein, the chambers being separated by a flexible membrane, the first chamber being in fluid communication with the transducer inlet whereby changes in the pressure at the inlet results in corresponding flexure of the membrane, and wherein the piston is retained for reciprocal movement between first and second limit positions in the second chamber, spring means biasing the piston into the first limit position, hydraulic fluid in the second chamber whereby flexure of the membrane in response to a predetermined minimum pressure in the first transducer chamber forces the piston to the second limit position thereby opening the respective component deficiency valve.

13. The explosion resistant safety shut-down device of claim 12 in which the mechanical interconnection between each pressure transducer and deficiency valve further includes a lever member and means for pivotally mounting the lever member in fixed relationship to the transducer piston and deficiency valve whereby movement of the transducer piston to the second limit position causes the pivotal rotation of the lever member and opening of the deficiency valve.

14. The explosion resistant safety shut-down device of claim 10 further including an OR shuttle valve having an output connected to the control input of the main valve and two inputs, one of the inputs being connected to the AND valve output whereby the third pressure signal from the AND valve is passed through the OR shuttle valve and opens the main valve thereby opening the main valve whenever both component spray lines are operating above predetermined minimum pressures.

15. The explosion resistant safety shut-down device of claim 14 further including start-up means operatively connected to the other OR shuttle valve input for manually applying a pneumatic starting signal thereto, whereby the starting signal is passed through the OR shuttle valve and opens the main valve to effect start-up of the sprayer system.

* * * * *